United States Patent [19]

Sasaki

[11] Patent Number: 4,973,984

[45] Date of Patent: Nov. 27, 1990

[54] THERMAL-HEAD DRIVING APPARATUS

[75] Inventor: Eiichi Sasaki, Yokohama, Japan

[73] Assignee: Ricoh Company, Ltd., Tokyo, Japan

[21] Appl. No.: 333,955

[22] Filed: Apr. 6, 1989

[30] Foreign Application Priority Data

Apr. 7, 1988 [JP] Japan .................................. 63-85714
Feb. 6, 1989 [JP] Japan .................................. 64-27131

[51] Int. Cl.[5] .............................................. G01D 15/10
[52] U.S. Cl. ................................................ 346/76 PH
[58] Field of Search .................................... 346/76 PH

[56] References Cited

U.S. PATENT DOCUMENTS 4,475,114 10/1984 Koyama et al. ............... 346/76 PH
4,675,695 6/1987 Samuel ................................. 346/1.1

*Primary Examiner*—Bruce A. Reynolds
*Assistant Examiner*—Gerald E. Preston
*Attorney, Agent, or Firm*—Oblon, Spivak, McClelland, Maier & Neustadt

[57] ABSTRACT

A thermal-head driving apparatus drives a thermal head having a plurality of heating resistors separated in a plurality of groups and disposed in one line, each of the heating resistors capable of being energized by heating pulses the number of which is controlled in accordance with the required density of the corresponding picture element, the heating resistors of the each group being adapted to be sequentially driven. The apparatus comprises a first unit for generating signals representative of time intervals of the heating pulses, which time intervals is determined to keep a temperature of the heating resistors above a predetermined temperature during operation, and a second unit for controlling a time intervals of heating pulses applied to the heating resistors in accordance with the signals from the first unit.

12 Claims, 10 Drawing Sheets

THERMAL-HEAD DRIVING APPARATUS

BACKGROUND OF THE INVENTION

The present invention relates to a thermal head driving apparatus, in particular, a thermal-head driving apparatus for printers, facsimiles, and copy machines.

As a related art to this invention, a thermal-head driving device is disclosed in the Japanese Unexamined Patent Publication No. 56-89971. The thermal-head driving device described in this Publication has a thermal head with a plurality of groups in which heating resistors are arranged in a line, and the thermal head is applied with both common signals and pulses having equal intervals for heating the heating resistors, group, by group sequentially.

The heating resistors in each group are switched on/off in turn due to a durability of the thermal-head, thereby lowering the temperature of heating resistors to less than the recording or coloring temperature of the input data during the intervals between the heating periods, thereby additional energy must be supplied for heating the heating resistors during the intervals to obtain the fine picture from the input data.

SUMMARY OF THE INVENTION

It is therefore an object of the present invention to provide a thermal-head driving apparatus having a high energy efficiency without supplying additional energy to the heating resistors during the intervals between the heating periods.

The object of the present invention can be achieved by utilizing a thermal-head driving apparatus for driving a thermal head having a plurality of heating resistors separated in a plurality of groups and disposed in one line. Each of the heating resistors is capable of being energized by heating pulses, the number of which is controlled in accordance with the required density of the corresponding picture element. The heating resistors of the each group are adapted to be sequentially driven. The apparatus of the present invention comprises a first unit for generating signals which are representative of time intervals of the heating pulses, which time intervals are determined to keep a temperature of the heating resistors above a predetermined temperature during operation. The apparatus also comprises a second unit which controls a time interval of the heating pulses applied to the heating resistors in accordance with the signals from the first unit.

Further objects and advantages of the present invention will be apparent from the following description of the preferred embodiments of the invention as illustrated in the accompanying drawings.

BRIEF DESCRIPTION OF THE DRAWINGS

FIG. 4(*b*) is the wave form charts indicating the temperatures of each heating resistor of the thermal head driving apparatus according to the present invention respectively;

DESCRIPTION OF THE PREFERRED EMBODIMENTS

Figure 1:
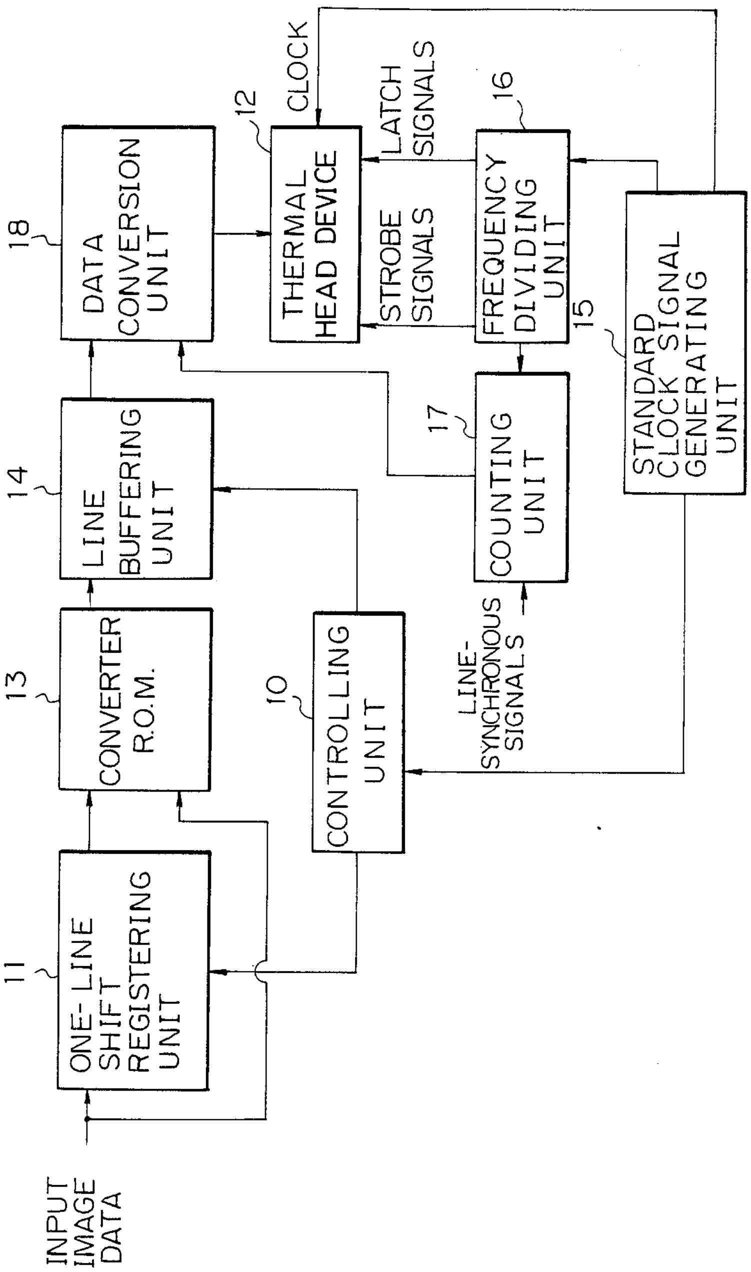
FIG. 1 is a block diagram of an embodiment of a thermal head driving apparatus according to the present invention.

In accordance with FIG. 1, a first image data or a first input-data, is a pulse number data which indicates the number of pulses to be supplied to the heating resistance elements, such as heating resistors of a thermal head device 12 for recording one picture element(dot) of the image or picture being copied. The input data is read sequentially by a one-line shift registering unit 11. The shift registering unit 11 outputs a second image or a second input data which corresponds to an input-data at the same elements in the line prior to the first input data.

A converter R.O.M. (Read Only Memory) 13 inputs the first input data along with the second input data, and outputs a data of a suitable pulse number, which is combined with the second input and the first input data, to a line buffering unit 14. That is, the data of a suitable pulse number is generated such that the pulses supplied to the heating resistors may be varied by the first input data which is controlled with the second input data.

Figure 2:
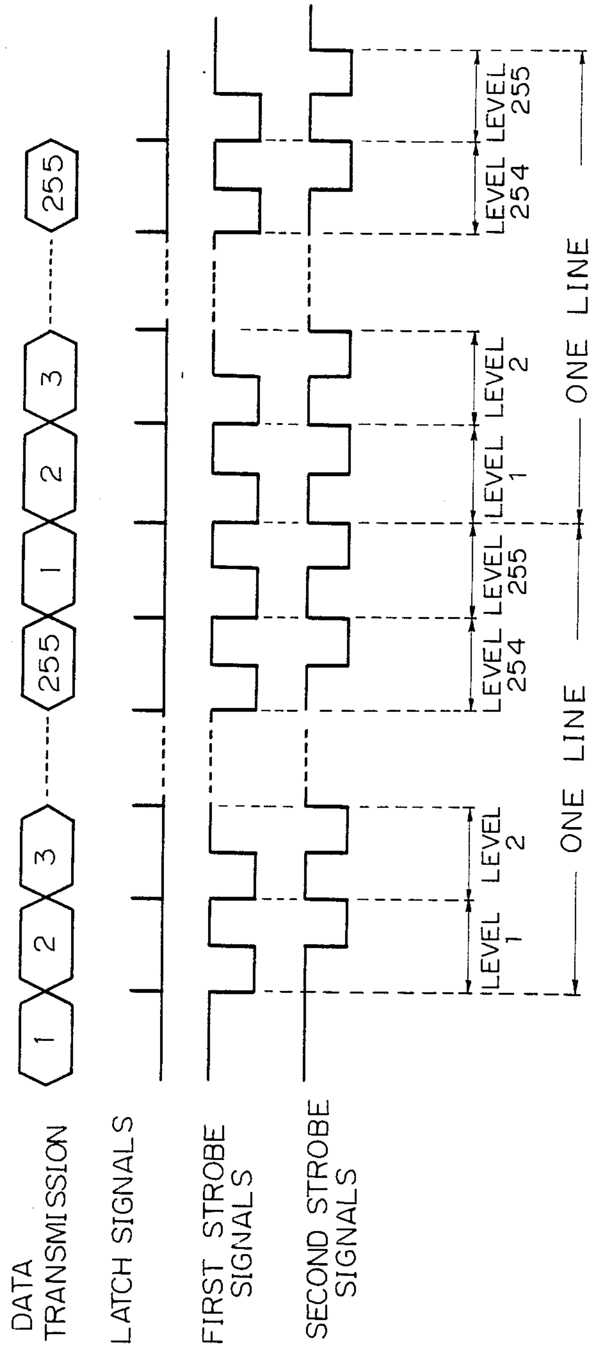
FIG. 2 is a timing chart of the apparatus of FIG. 1.

A frequency dividing unit 16 scales down the standard clock signals from a standard clock signal generating unit 15. The frequency dividing unit 16 also generates counter pulses, latch signals, and strobe signals having the first and the second strobe signals as shown in FIG. 2.

A counting unit 17 is reset by the line-synchronous signals, and counts the counter pulses from the frequency dividing unit 16. The line-synchronous signals have the same period of time as that of the input data.

A standard clock signal generating unit 18 sets the period of the standard clock signals so as to generate the first and the second strobe signals alternatively and continually.

A controlling unit 10 controls the one-line shift registering unit 11 and the line buffering unit 14 according with the standard clock signals from the standard clock signal generating unit 15. The line buffering unit 14 transmits one line amount of data repeatedly as is shown in FIG. 2.

And the data-conversion unit 18 converts the data sent from the converter R.O.M. into pulses of each gradient level, and the data in each line is transmitted continuously by lengthening the period of the standard clock signals from the standard clock signal generating unit 15.

The data conversion unit 18 compares the data of one line read in from the line buffering unit 14 with the value of the counting unit 17 to provide binary-valued data, '0' or '1', which is sent to the thermal head device 12 in the manner of the data transmission 1 shown in FIG. 2.

Figure 5:
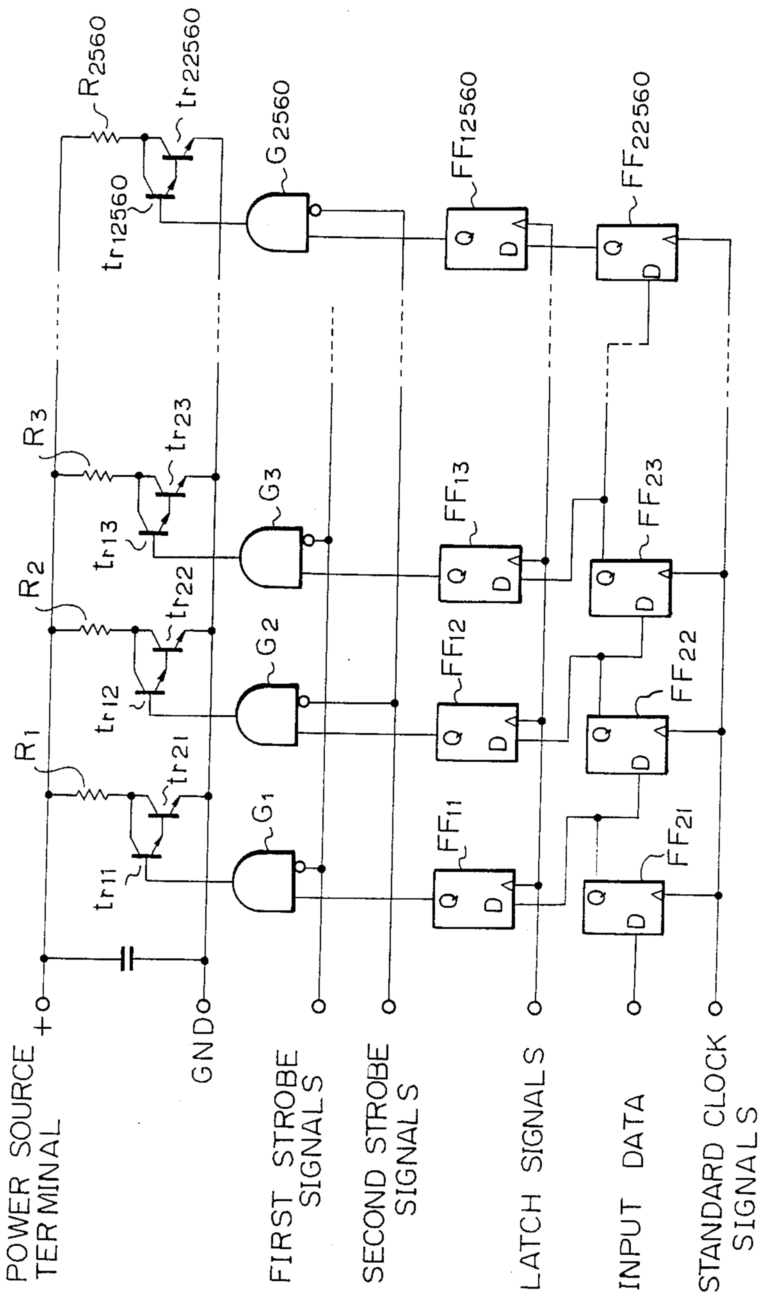
FIG. 5 is a schematic diagram of the circuit architecture of a thermal-head having transistors, gates, and D-flip flops of other embodiment of the apparatus of the present invention.
Figure 6:
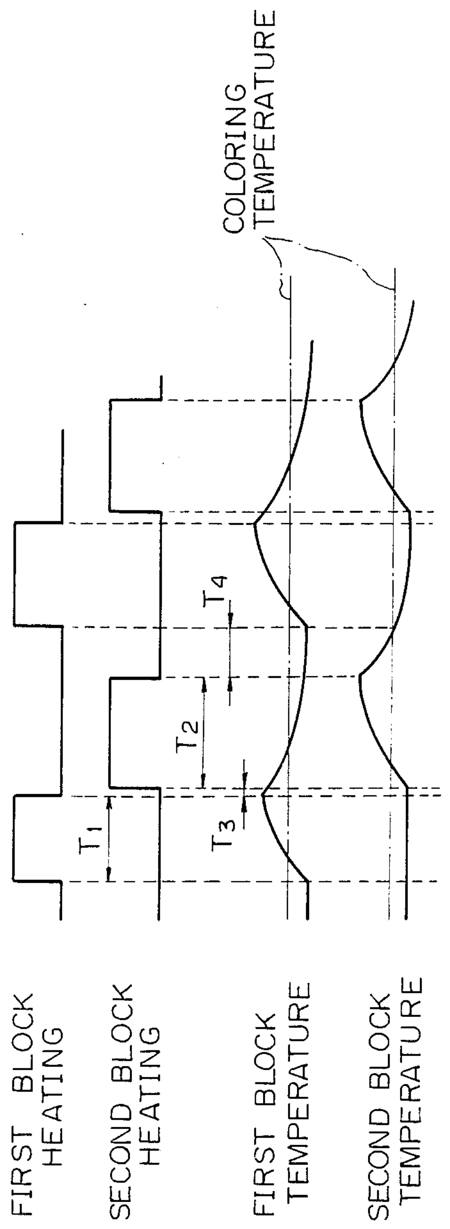
FIG. 6 is a timing chart indicating the temperatures of the heating resistors in the thermal-head device of the related art.

As is shown in FIG. 5, the thermal head device 12 has 2,560 heating resistors R1 to R2560, and the data control unit having transistors tr11 to tr12560 and tr21 to tr22560, gates G1 to G2560, latch circuits FF11 to FF12560 each being a D-flip-flop, and shift registers FF21 to FF22660 each being a D-flip-flop.

2,560 heating resistors R1 to R2560 are disposed in a line. Every time 2,560 data are sent from the data-conversion conversion unit 18 to the thermal head device 12, the counting unit 17 counts up by one each time as receiving a counter pulse from the frequency dividing unit 16.

Each of 2,560 data from the data conversion unit 18 is read into one of the shift registers FF21 to FF22560 respectively, by the standard clock signals from the standard clock signal generating unit 15, and latched into the latch circuits FF11 to FF12560 by the latch signals from the frequency dividing unit 16.

2,560 heating resistors R1 to R2560 are divided into a first group having odd numbered resistors R1,R3, . . . . ,R2559, and a second group having even numbered resistors R2,R4, . . . . ,R2860 respectively.

At the time, when the gates G1,G3, . . . ,G2559 are activated by the first strobe signals from the frequency dividing unit 16, the transistors tr11 and tr21, tr13 and tr23, . . . ,tr12599 and tr22599 are turned on according to the data from the latch circuits FF11,FF13, . . . . ,F12599 respectively, and the heating resistors of the first group R1,R3, . . . ,R2559 are heated up as turned on by the power source. Then the gates G2,G4, . . . ,G2560 are activated by the second strobe signals from the frequency dividing unit 16, and the transistors tr12 and tr22, tr 14 and tr 24, . . . . ,tr12560 and tr22560 are turned on according to the data from the latch circuits FF12,FF14, . . . . ,F12560 respectively, and submittedly the heating resistors of the second groups R2,R4, . . . . ,R2560 are heated up as turned on by the power source.

While the heating resistors R1 to R2560 are being heated up, the data transmission 2 shown in FIG. 2 is performed. In the data transmission 2, the counting unit 17 is incremented by one in the data transmission 1, and the data-conversion unit 18 converts the data from the line-buffering unit 14 by using the value of the counting unit 17 into the binary-valued data '0' or '1' and sends the binary valued data to the thermal head device 12. The data from the data-converting unit 18 are read by shift register FF21 to FF22560 according to the clock from the standard clock signal generating unit 15 and are latched into the latch circuits FF11 to FF 12560 by the latch signals from the frequency dividing unit 16. The activation of the datas G1, G3, ...,G2599 by the first strobe signals from the frequency dividing unit 16 causes the transistors tr11 and tr21, tr13 and tr23, ....,tr12599 and tr22599 to be turned on according to the data of the latch circuits FF11, FF13, ....,FF12599 and consequently causes the heating resistors of the first group R1, R3, . . . . ,R2599 to be heated up as turned on by the power source. The further activation of the dates G2, G4, . . . ,G2560 by the second strobe signals from the scaling unit 16 causes the transistors tr12 and tr22, tr14tr and 24, . . . . . tr12560 and tr22560 to be turned on according to the data of the latches FF12, FF14, . . . . ,FF12560 and consequently causes the heating resistors of the second group R2, R4, . . . ,R2560 to be heated up as turned on by the power source.

Figure 3:
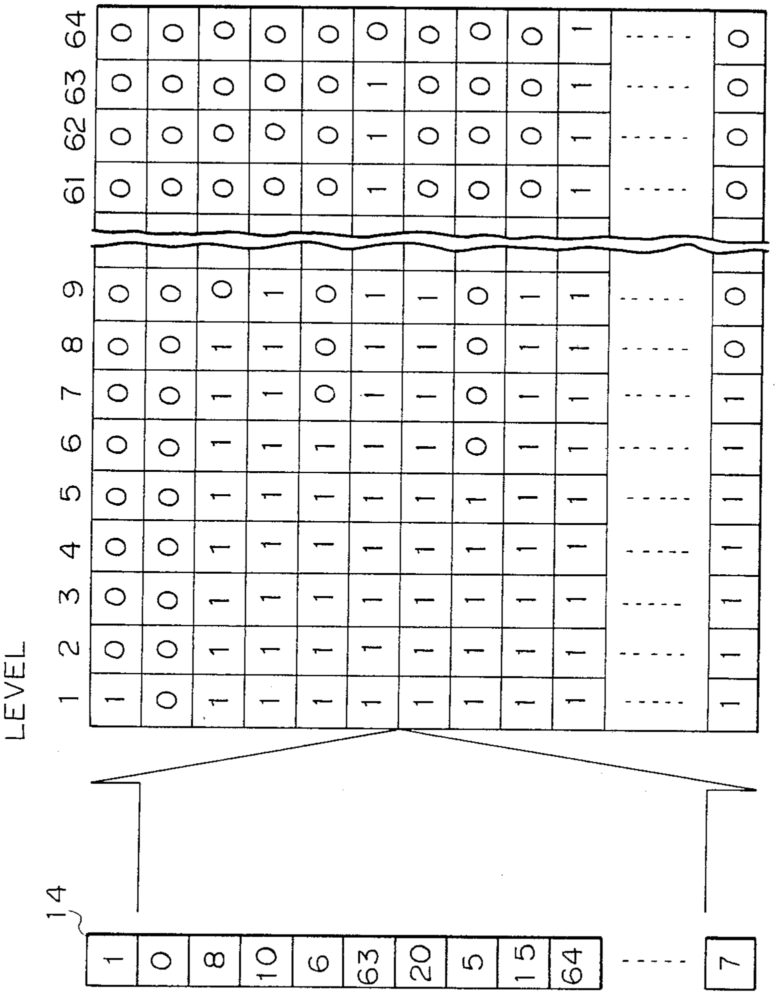
FIG. 3 is a tabular diagram to illustrate the data conversion function of a data-conversion part of the apparatus of FIG. 1.

The operation continues in this same manner. As is shown in FIG. 3, in the data-conversion unit 18, the pulse number data in one line sent from the line-buffering unit 14 is compared with each of 255 levels indicated by the counting unit 17 in order to provide a data with 1 to 255 gradient levels which is transferred to the thermal head device 12 as 'data transmission' 1, 2, . . . . , 255 shown in FIG. 2. In the thermal head device 12, those data are read into the shift register FF21 to FF22560 by the clock signals from the frequency dividing unit 16; the first and the second strobe signals alternatively activate the gates G1, G3, . . . . ,G2599 and G2, G4, . . . ,G2560, respectively, to cause the transistors tr11 and tr21, tr13 and tr23, . . . . , tr12599 and tr 22599, and tr12 and tr22, tr14 and tr24, . . . ,tr12560 and tr22560 to be alternatively turned on depending on the data of the latch circuits FF11, FF13, . . . ,FF12599 and FF12, FF14, . . . . ,FF12560 respectively, so that the heating resistors R1, R3, . . . ,R2599 and R2, R4, . . . . ,R2560 are heated up as turned on by the power source according to the data.

The data transmission 1, 2, . . . . 256 causes the heating resistors R1 to R2560 to be heated up for recording one, line portion of a picture on a recording paper (with the help of an ink sheet) or on a thermosensible paper, and the above sequence is repeated for the data in each line until recording of the whole picture on a recording paper is completed.

Figure 4:
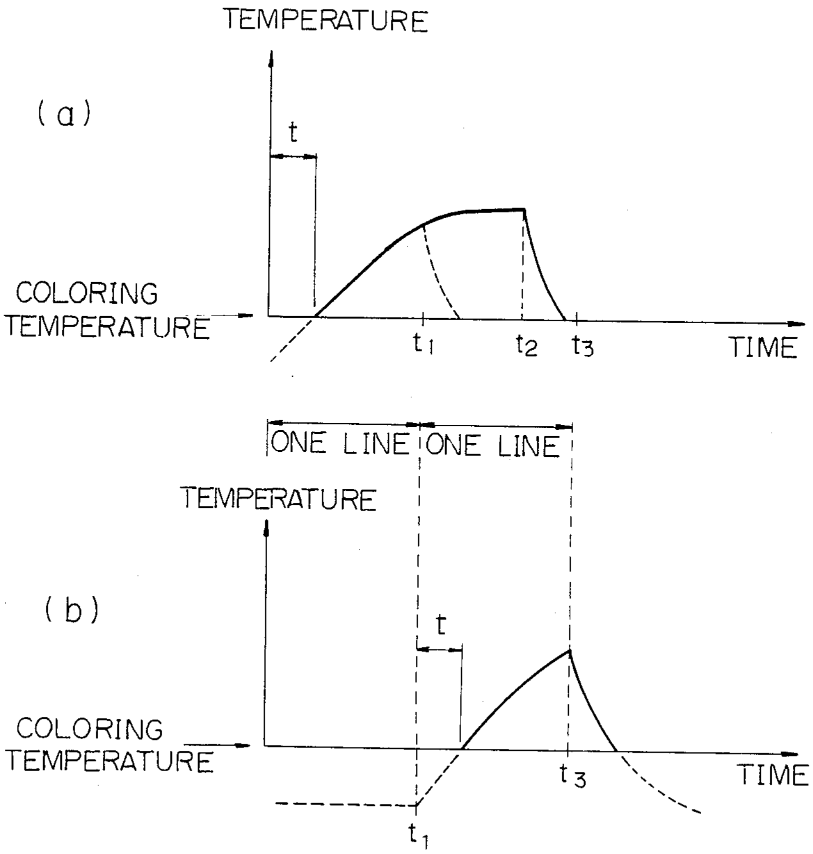
FIG. 4(*a*) is the wave form charts indicating the temperatures of each heating resistor of the thermal-head driving device according to the related art.

In the operation mentioned above, the temperature of the heating resistors R1 to R2560 varies as shown in FIG. 4 (*a*).

In the related art, as shown in FIG. 4 (*b*), the recording will not start until a certain time period passes from the initial time t, that is, this time period t is wasted.

On the other hand, in this embodiment, as shown in FIG. 4 (*a*), the heating resistors R1 to R2560 are heated up successively for each line. In other words, the applying time of maximum energy to the heating resistors for recording each line continues to the next applying time of energy to the heating resistors for recording the next line without the cooling period between the recording time for each line, so that the temperature of the heating resistors R1 to R2560 are kept high enough because of the energy applying time does not exceed $t2-t1$ ($<t3-t1-t$), and the energy efficiency is improved.

Figure 7:
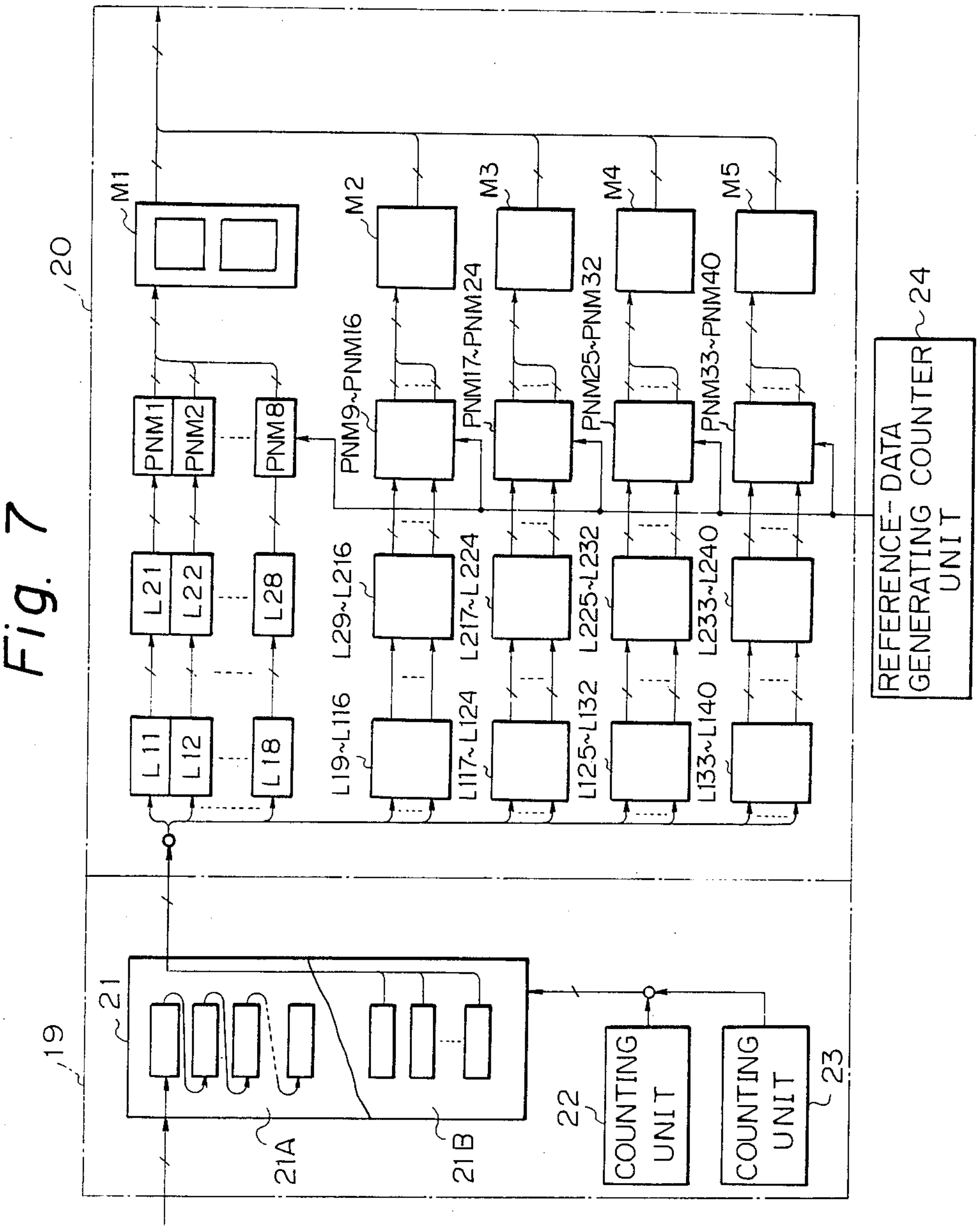
FIG. 7 is a block diagram of the line buffering unit, the data-conversion unit and the reference-data generating counter unit of the apparatus of FIG. 5.

FIG. 7 shows another embodiment according to the present invention where the numerals 19, 20, and 24 are a line-buffering, a data-conversion, and a reference data generating counter units, respectively.

Figure 9:
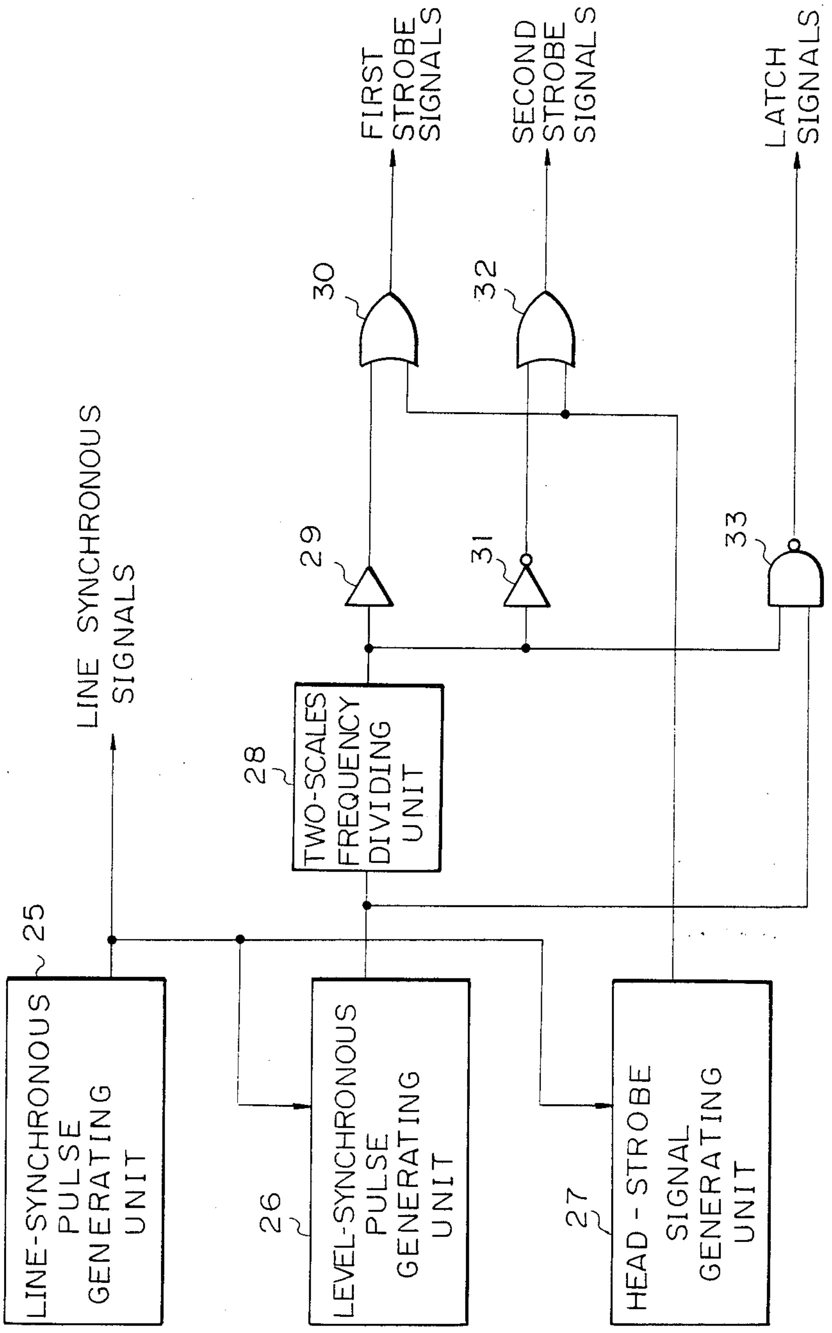
FIG. 9 is a block diagram of a pulse-width timer having a line-synchronous pulse generating unit, level-synchronous pulse generating unit, a head-strobe signal generating unit, and a two-scales frequency dividing unit of the apparatus of FIG. 7.

In this embodiment, the line-buffering unit 19 and the data-conversion unit 20 are used in place of the line-buffering unit 14 and the data-conversion unit 18 of the previous embodiment, respectively, and the frequency dividing unit 16 is replaced by a pulse-width timing unit as shown in FIG. 9.

As shown in FIG. 7, the line-buffering unit 19 comprises line memory 21 and counters 22, 23. The line memory 21 is divided into two areas of 21A and 21B with 4 K-byte each which are selected by the line-synchronous signals. The counters 22, 23 are for writing and reading of the data, respectively, with the initial value of 2559 to count down for every writing and reading of the data in the memory 21, respectively. The data is not written in the memory 21 after the counters 22, 23 have reached zero. The outputs of the counters 22,23 are changed by Read/Write mode signals alternatively.

Figure 8:
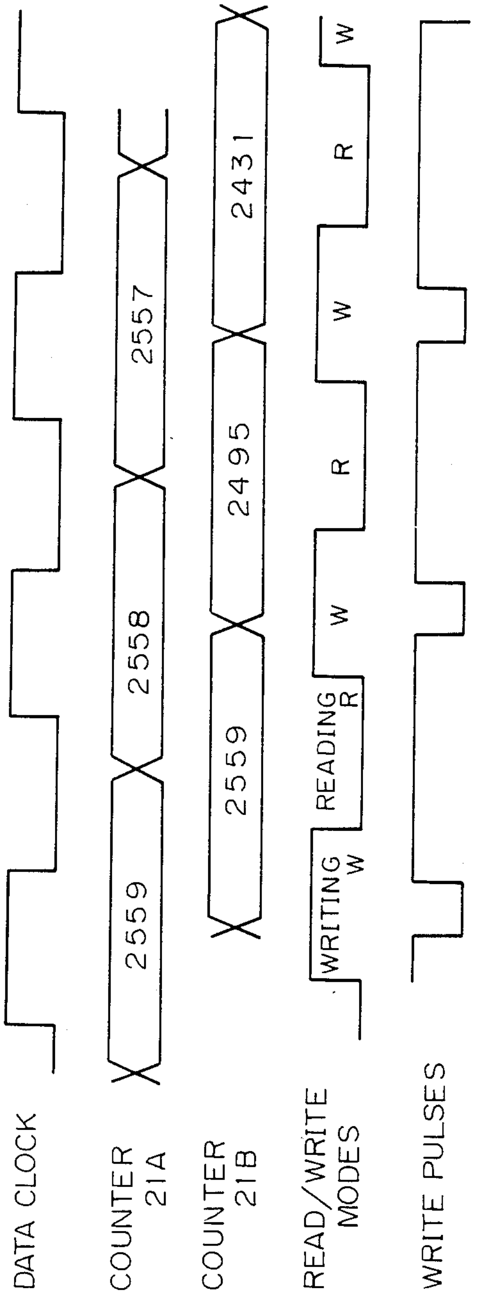
FIG. 8 is a timing chart of the signals supplied from the converter R.O.M. to the memory in the line buffering unit of the apparatus of FIG. 7.

As shown in FIG. 8, in writing the input data of the converter R.O.M. 13 to the memory 21, the data is written by descending from a high address in every location of the line memory 21A as 2559, 2558, . . . . , 0. And the data is read from every 64 locations of the line memory 21B as 2559, 2496, . . . . , 63, and 2568, 2494, . . . . 62. This is because each driver in a thermal head has a 64bit structure.

The data-conversion unit 20 comprises the first latch circuits L11 to L140, the second latch circuits L21 to L240, PNM circuits PNM1 to PNM40 having magnitude comparators, and head memories M1 to M5.

In a first operation process, forty picture data are latched into the first latch circuits L11 to L140 from the addresses 2559, 2495, . . . ,63 of the line memory 21. Then the contents of the first latch circuits L11 to L140 are latched simultaneously by the second latch circuits L21 to L240.

In a second operation process, in the PNM circuits PNM1 to PNM40, firstly the data of the second latch circuits L21 to L240 are compared with the reference datum '0' from the reference data generating counter unit 24, and if greater than the reference data, the data is converted into '1', otherwise into '0'. The results are written in the head memories M1 to M5.

Then in a third operation process, the data of the second latch circuits L21 to L240 are compared with the reference datum '1' from the reference data generating counter unit 24, and if greater than the reference data, the data is converted into '1', otherwise into '0'. The results are written in the head memories M1 to M5.

In the fourth operation process, the data of the second latch circuits L21 to L240 are compared with the reference datum '2' from the reference data generating counter unit 24, and if greater than the reference data, the data is converted into '1', otherwise into '0'. The results are written in the head memories M1 to M2.

Each time, the reference data from the reference generating counter unit 24 is incremented by one sequentially. Hereafter the data of the second latch circuits L21 to L240 are compared with each of the reference data '2', '3', '4', .., '255' from the reference data generating counter unit 24 in turn and converted into binary values either '0' or '1' which are stored into the memories M1 to M2. As a result, in the PNM circuits PNM1 to PNM40, the data of the second latch circuits L21 to L240 are converted into the head memories M1 to M8 with 256 gradient levels.

Each bit of the six higher-order bits of an address in the head memories M1 to M5 indicates a dot number, and each of the eight lower-order bits indicates a level number, i.e., a number representing one of the gradient levels.

In the 1st through 4th operation processes described above, the dot numbers in the addresses of the head memories M1 to M8 are '0', and the level numbers in the addresses of the same head memories vary from '0' to '255' according to the reference data of the reference data generating counter unit 24.

During the 2nd through 4th operation processes, the next forty of the input data are read from the addresses 2558,2494, . . . . ,62 of the line memory 21 and latched into the first latch circuits L11 to L140.

When the operation of the 2nd through 4th processes end, the contents of the first latch circuits L11 to L140 are latched simultaneously into the second latch circuits L21 to L240, and then converted into 256 gradient levels written in the head memories M1 to M6.

In the same manner, the input data of the picture are read by forty each time, and converted into the data with 256 gradient levels, then written in the head memories M1 to M5 as the dot numbers being changed into '2' to '63' according to each reading of the forty of picture data.

After the operation processes described above, the data of the level number '0' and the dot number '0' to '6S' in the memories M1 to M5 are read synchronously with latch signals, then transmitted to the input of the thermal head as input data.

Figure 10:
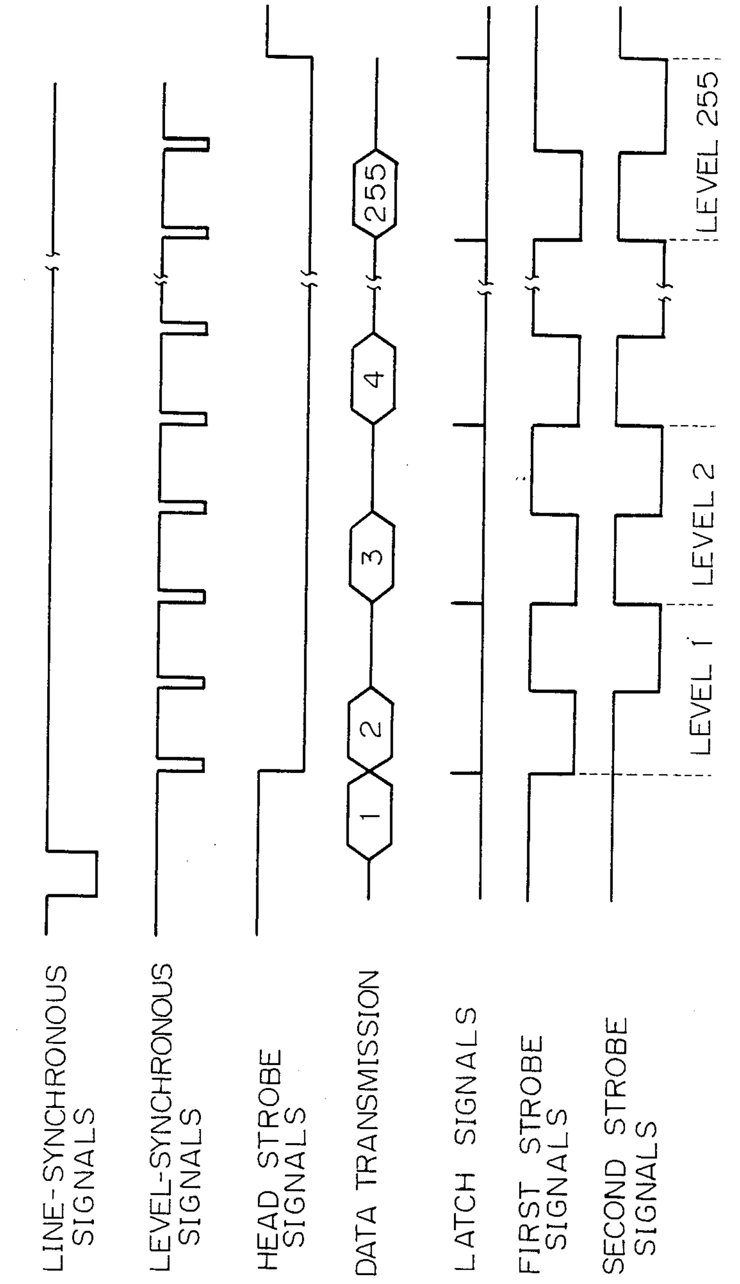
FIG. 10 is a timing chart of signals for operating the heating resistors in the thermal-head of the apparatus of the FIG. 7.

In the same manner, the data in each level number of '2' to '255' and in dot number '0' to '63' are read and transmitted to the thermal head as input data. In FIG. 10, the timing chart of the operation described above is shown.

Each group of the head memory M1 to M8 is divided into two areas of 64×256 bytes each, which is switched by the line synchronous signals. In FIG. 9, a pulse-width timing unit in this embodiment is shown.

A line synchronous pulse generating unit 25 generates a line-synchronous pulse.

A level-synchronous pulse generating unit 26 generates a level-synchronous pulse whose period equals the width of the pulse which is applied to each group of the heating resistors R1 to R2560 in the thermal head 2.

A head-strobe-signal-generating unit 27 generates a pulse-apply enable signal for each gradient level '1' to '255'.

The line-synchronous signal from the line-synchronous pulse generating unit 25 resets the line-synchronous pulse generating unit 26 and the head-strobe-signal-generating unit 27.

The output signal of the level-synchronous pulse generating unit 26 is divided by a factor 2 by a two-scales frequency dividing unit 28, passes through a buffer 29, and is ORed by an OR gate 30 with the output signals of the head-strobe-signal-generating unit 27. Another output signals of the two-scales frequency dividing unit 28 is inverted by an inverter 31 and is ORed by an OR gate 32 with the output signals of the head-strobe-signal-generating unit 27. The output signals of the OR gates 30 and 32 are sent to the thermal head device 12 as strobe signals to select the first group of the heating resistors R1, R3, . . . . , R2599 and the second group of the heating resistors R2, R4, . . . . , R2560, respectively. A NAND gate NANDs the output signals of the level-synchronous pulse generating unit 26, and the two-scales frequency dividing unit 28, and the resultant signals are sent to the thermal head device 12 as head latch signal.

Many widely different embodiments of the present invention may be constructed without departing from the spirit and scope of the present invention. It should be understood that the present invention is not limited to the specific embodiments described in the specification, except as defined in the appended claims.

what is claimed is:

1. A thermal-head driving apparatus for driving a thermal-head having a plurality of heating resistors separated in two groups, one of said two groups being constituted of a set of heating resistors with odd-numbers, and the other one of said two groups being constituted of a set of heating resistors with even-numbers, each of said heating resistors capable of being energized by heating pulses and said two groups of heating resistors adapted to be alternately driven for writing successive lines of information, said apparatus comprising:

a first means for generating signals representative of time intervals of said heating pulses applied to said heating resistors in said two groups;

a second means for controlling said time intervals between heating pulses applied to said heating resistors in said one of said two groups and heating pulses applied to said heating resistors in said other one of said two groups such that a time for applying a maximum energy signal to said heating resistors in each of said two groups for recording each line of information will continue to the time for applying a maximum energy signal to said heating resistors in said other of said two groups, thereby recording a next line of information without a cooling period between a recording time for each line of information so as to maintain a predetermined temperature of said heating resistors in said two groups.

2. An apparatus claimed in claim 1, wherein said first means has a signal generating means for generating strobe signals, latch signals, and clock signals applied to said controlling means for controlling said time intervals of heating pulses.

3. An apparatus as claimed in claim 2, wherein said signal generating means has a standard clock signal generating unit and a frequency dividing unit, said standard clock signal generating unit supplying clock signals to said frequency dividing unit and said controlling means, said frequency dividing unit supplying said strobe signals and latch signals to said controlling means.

4. An apparatus claimed in claim 1, wherein said controlling means has a signal controlling means for controlling said strobe signals, said latch signals, and said clock signals supplied from said signal generating means for controlling said time intervals of heating pulses.

5. An apparatus as claimed in claim 4, wherein said signal controlling means has shift registers, latch circuits, gates, and transistors, said shift registers having a plurality of D-flip flops for receiving picture image data by a clock signal supplied from said clock signal generating unit, said latch circuits having a plurality of D-flip flops for receiving said latch signals to control said picture image data and said transistors, said gates receiving said strobe signals for controlling said latch signals being supplied to transistors and for controlling said time intervals of heating pulses.

6. An apparatus as claimed in claim 2, wherein said signal generating means has a line-synchronous pulse generating unit, a level-synchronous pulse generating unit, and a head-strobe signal generating unit for generating strobe signals, latch signals and line-synchronous signals.

7. An apparatus as claimed in claim 6, wherein said signal generating means further has a two-scales frequency dividing unit for dividing said level-synchronous pulses by two-scales, a buffer having an input connected to the output of said two-scales frequency dividing unit, a first OR gate for taking an or between signals from said buffer and said head-strobe signal generating unit to output a one of said strobe signals, an inverter for inverting said two-scaled signal from said two-scale frequency dividing unit, a second OR gate for taking an or between signals from said inverter and said head-strobe signal generating unit to output one of strobe signals, and a NAND gate for taking a nand between signals from said two-scales frequency dividing unit and said level-synchronous pulse generating unit.

8. An apparatus claimed in claim 1, said signal controlling means further has a buffering means for transmitting a picture image data, a data-conversion means for converting said picture image data into binary valued data, and a counting means for counting a signal from said frequency dividing unit.

9. An apparatus as claimed in claim 8, said buffering means has a line memory divided into two areas, for reading and writing said binary valued data, and two counters.

10. An apparatus as claimed in claim 8, said data-conversion means has a first latch circuits for latching said picture image data being read sequentially from said line memory, a second latch circuits for latching said picture image data from said first latch circuits, PNM(Pulse Number module) circuits for converting said picture image data from said second latch circuits into said binary-valued data, and head memories for writing said binary-valued data.

11. An apparatus as claimed in claim 10, wherein said head memories having six high-order bits indicating dot numbers and eight low-order bits indicating level numbers.

12. An apparatus as claimed in claim 10, wherein said PNM circuits comprise magnitude comparators.

* * * * *